United States Patent
Francis, Jr. et al.

(10) Patent No.: US 8,452,451 B1
(45) Date of Patent: May 28, 2013

(54) METHODS AND SYSTEMS FOR ROBOTIC COMMAND LANGUAGE

(75) Inventors: Anthony G. Francis, Jr., San Jose, CA (US); Ryan Hickman, Mountain View, CA (US); James J. Kuffner, Jr., Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/464,414

(22) Filed: May 4, 2012

Related U.S. Application Data (60) Provisional application No. 61/483,295, filed on May 6, 2011.

(51) Int. Cl.
*G05B 15/00* (2006.01)

(52) U.S. Cl.
USPC .......... 700/258; 700/245; 700/246; 700/257; 700/259

(58) Field of Classification Search
USPC ............. 700/245, 246, 257, 258, 259; 901/8, 901/19, 30, 46
See application file for complete search history.

(56) References Cited

U.S. PATENT DOCUMENTS

| | | | |
|---|---|---|---|
| 6,717,528 B1 * | 4/2004 | Burleson et al. | 340/9.1 |
| 6,850,818 B2 * | 2/2005 | Sabe et al. | 700/257 |
| 7,139,642 B2 * | 11/2006 | Kamoto et al. | 700/248 |
| 7,269,479 B2 | 9/2007 | Okamoto et al. | |
| 7,317,388 B2 * | 1/2008 | Kawabe et al. | 340/539.13 |
| 7,653,458 B2 * | 1/2010 | Koga et al. | 700/245 |
| 8,296,151 B2 * | 10/2012 | Klein et al. | 704/275 |
| 2004/0117063 A1 * | 6/2004 | Sabe et al. | 700/245 |
| 2004/0153211 A1 * | 8/2004 | Kamoto et al. | 700/245 |
| 2005/0004710 A1 * | 1/2005 | Shimomura et al. | 700/246 |
| 2005/0218292 A1 * | 10/2005 | Kawabe et al. | 250/206 |
| 2006/0195226 A1 * | 8/2006 | Matsukawa et al. | 700/245 |
| 2007/0022078 A1 | 1/2007 | Gupta et al. | |
| 2007/0135962 A1 * | 6/2007 | Kawabe et al. | 700/225 |
| 2007/0150105 A1 * | 6/2007 | Orita et al. | 700/245 |
| 2007/0150106 A1 * | 6/2007 | Hashimoto et al. | 700/245 |
| 2008/0086236 A1 * | 4/2008 | Saito et al. | 700/245 |
| 2011/0112839 A1 | 5/2011 | Funakoshi et al. | |
| 2011/0245974 A1 * | 10/2011 | Kawamoto et al. | 700/259 |
| 2012/0059514 A1 * | 3/2012 | Suh | 700/245 |

OTHER PUBLICATIONS

Kemke, C., An Action Ontology Framework for Natural Language Interfaces to Agent Systems, http://www.cs.umanitoba.ca/~ckemke/papers/AIRE-Kemke-v3.pdf, 2007.

\* cited by examiner

*Primary Examiner* — Khoi Tran
*Assistant Examiner* — Jorge Peche
(74) *Attorney, Agent, or Firm* — McDonnell Boehnen Hulbert & Berghoff LLP (57) ABSTRACT

Methods and systems for robotic command and operation are provided. In some examples, a robot may be configured to receive a short-form command input that is comprised of an action verb and an object/target, and to analyze contextual/situational data for event outcomes from which the robot can determine an action of a plurality of possible actions to execute. The determination and analyses functions may be performed, in whole or part, through use of a cloud computing system.

18 Claims, 7 Drawing Sheets

METHODS AND SYSTEMS FOR ROBOTIC COMMAND LANGUAGE

CROSS-REFERENCE TO RELATED APPLICATIONS

This application claims priority to U.S. Patent Application No. 61/483,295 filed on May 6, 2011, the entire contents of which are herein incorporated by reference.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service or system (or even an aggregation of existing cloud services) is "the cloud."

Cloud computing has been referred to as "client-server computing," however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software that collect commands from the user and interpret the commands into commands on the servers. The servers may handle the computing, and can either store or retrieve information from database servers or file servers and display an updated page to the user. Through "cloud computing," data across multiple servers can be synchronized around the world allowing for collaborative work on one file or project, from multiple users around the world, for example.

SUMMARY

In one example, a method is provided comprising receiving, at a robotic device that includes at least one sensory device, a short-form command comprising at least an action descriptor and a target for the action descriptor. The method also includes determining a plurality of functions corresponding to the action descriptor, and determining a plurality of targets in an environment of the robotic device that at least relate to the target. The method further includes determining, from the plurality of functions, a given function to perform based on the plurality of targets in the environment relating to the target and on the environment of the robotic device.

In another example, a computer readable medium having stored therein instructions executable by a robotic device that includes at least one sensory device to cause the robotic device to perform functions is provided. The functions comprise receiving a short-form command comprising at least an action descriptor and a target for the action descriptor, and determining a plurality of functions corresponding to the action descriptor. The functions also comprise determining a plurality of targets in an environment of the robotic device that at least relate to the target, and determining, from the plurality of functions, a given function to perform based on the plurality of targets in the environment relating to the target and on the environment of the robotic device.

In another example, a robotic device is provided that comprises one or more processors, at least one sensor coupled to the one or more processors and configured to capture data about an environment in a vicinity of the at least one sensor, and memory including instructions stored thereon executable by the one or more processors to perform functions. The functions comprise receiving a short-form command comprising at least an action descriptor and a target for the action descriptor, determining a plurality of functions corresponding to the action descriptor, and determining a plurality of targets in the environment of the robotic device that at least relate to the target. The functions also comprise determining, from the plurality of functions, a given function to perform based on the plurality of targets in the environment relating to the target and on the environment of the robotic device.

Any of the systems and methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the Figures and the following Detailed Description.

DETAILED DESCRIPTION

In the following detailed description, reference is made to the accompanying Figures, which form a part hereof. In the Figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure includes, inter alia, methods and systems for robot and user interaction over the cloud. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. In some examples, a robot may be configured to receive a second device, such as mobile phone, that may be configured to function as an accessory or a "brain" of the robot.

In examples described herein, a robot may interact with the cloud to perform any number of actions, such as to share information with other cloud computing devices. Within examples, a robot may interact with a user in a manner that is based upon many types of received information. A robot may access a user device to determine or identify information about a user or related to the user, and the robot may be configured to tailor a method of interaction with the user based on the identified information. A robot may further receive data associated with the user to identify the user, such as using speech or face recognition. The robot may provide a personalized interaction or response to the user based on the determined information of the user.

In examples, a method and system for using a robot command language is provided. The command language may form a basis for human (user) and robot (agent) communication through natural language. In some examples, a robot may be configured to convert a short-form command given by the user in terms of an action-and-object (e.g., verb-and-noun) into a series of higher-level and lower-level functions for the robot to evaluate and potentially perform. The robot may be configured to interpret commands based on surroundings and present a menu of determined actions (output functions) that the robot may perform in response to the command, so that the user can select an action, or confirm to the robot that the robot is taking a desired action. Alternatively, the robot may autonomously determine or select an action, and execute the action without user input or selection. In other examples, contextual/situational data obtained from an environment of the robot and/or a user may further be used to determine an action. Converting and interpreting (command language processing) can be accomplished through use of a cloud computing system.

1. Cloud Computing Architecture

Figure 1:
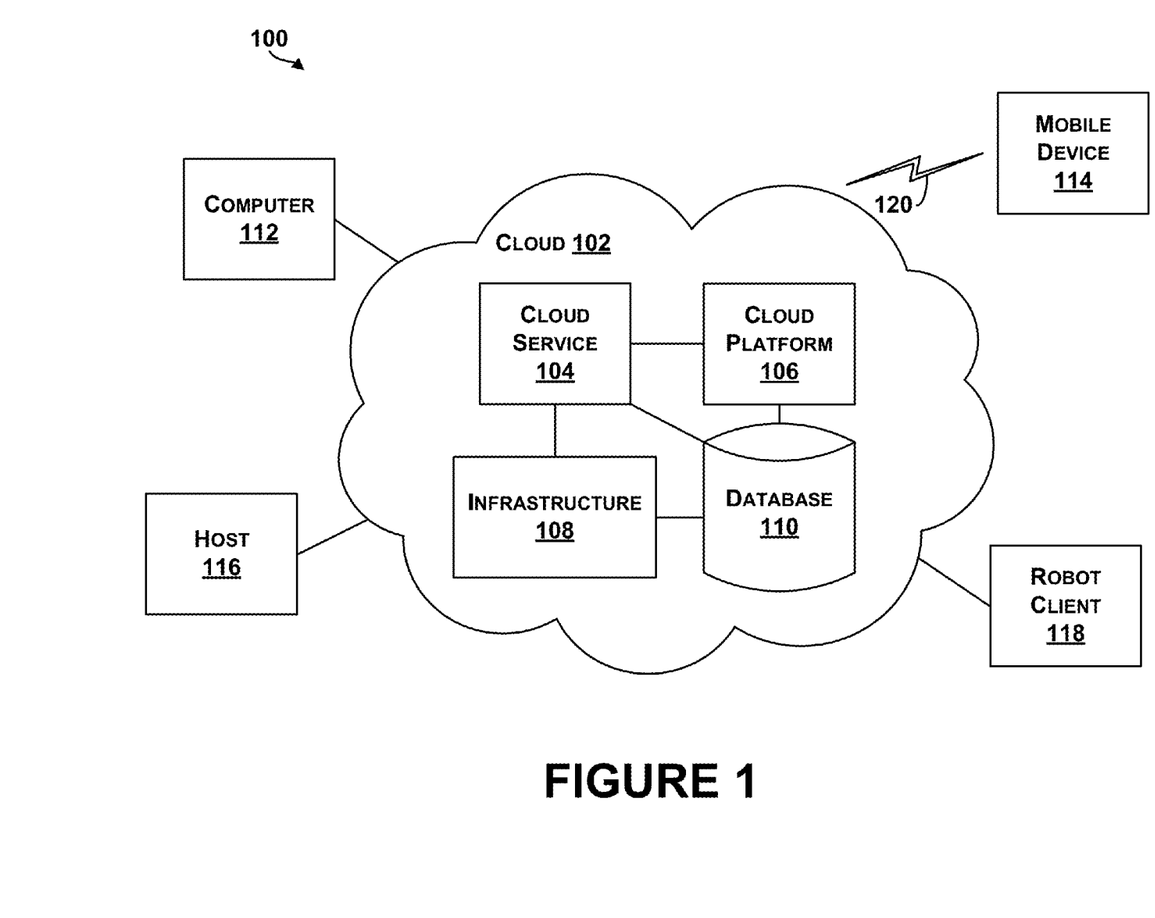
FIG. 1 is an example system for cloud-based computing.

Referring now to the Figures, FIG. 1 is an example system 100 for cloud-based computing. Cloud-based computing generally refers to networked computer architectures in which application execution and storage may be divided, to some extent, between client and server devices. A "cloud" may refer to a service or group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The exemplary system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer), and the mobile device 114 may be any type of mobile computing device (e.g., laptop, mobile telephone, cellular telephone).

The host 116 may be any type of computing device or transmitter including a laptop computer, a mobile telephone, that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors (still image or motion picture), biosensors, Radio Frequency identification (RFID) systems, RADAR wireless sensors, haptic arrays and other touch sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. Example Robot Architecture

Figure 2A:
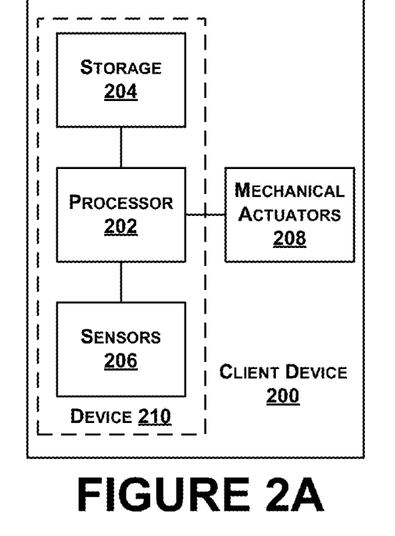
FIG. 2A illustrates an example client device.

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, sensors 206) may all be custom-designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot, as discussed above.

The client device 200 may also have components or devices that allow the client device 200 to interact with its environment. For example, the client device 200 may have mechanical actuators 208, such as motors, wheels 222, movable arms 220, that enable the client device 200 to move or interact with the environment.

In some examples, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the client device 200 may be configured to receive a device, such as device 210, that includes the processor 202, the storage 204, and the sensors 206. For example, the client device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the Internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch screen, that are included within the device 210.

Figure 2B:
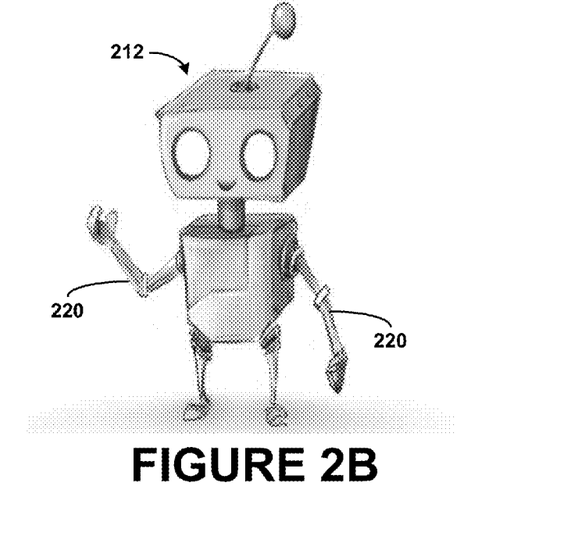
FIG. 2B illustrates a graphical example of a robot.

FIG. 2B illustrates a graphical example of a robot 212. In FIG. 2B, the robot 212 is shown as a mechanical form of a humanoid including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
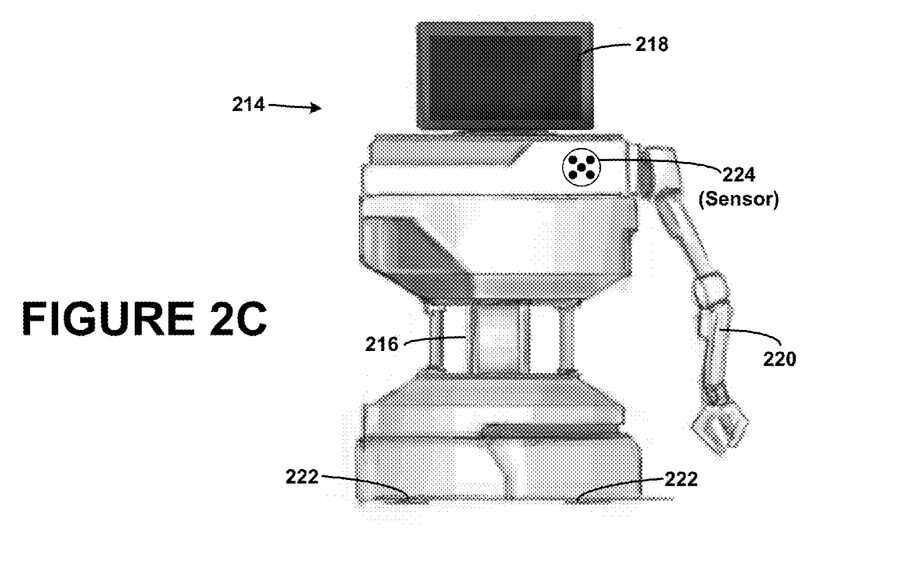
FIG. 2C illustrates another example of a robot.

FIG. 2C illustrates another example of a robot 214. The robot 214 includes a computing device 216, and a mechanical actuator 220. In this example, the computing device 216 may be a laptop computer or the equivalent thereof. Here, the robot has been provided with a video display or monitor 218, which may be coupled to sensors 224. The video monitor 218 could, as here, be used to project an image relating to a personality then being adopted by the robot 214. The sensors 224 may include a camera, infrared projectors, and other motion sensing or vision sensing elements. The robot 214 may include a base, wheels 222, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management), to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio). A robot operating system may include publish and subscribe functionality, and may also include functionality to control components of the robot, such as head tracking, base movement (e.g., velocity control, navigation framework).

3. Robot and Cloud Interaction

Figure 3:
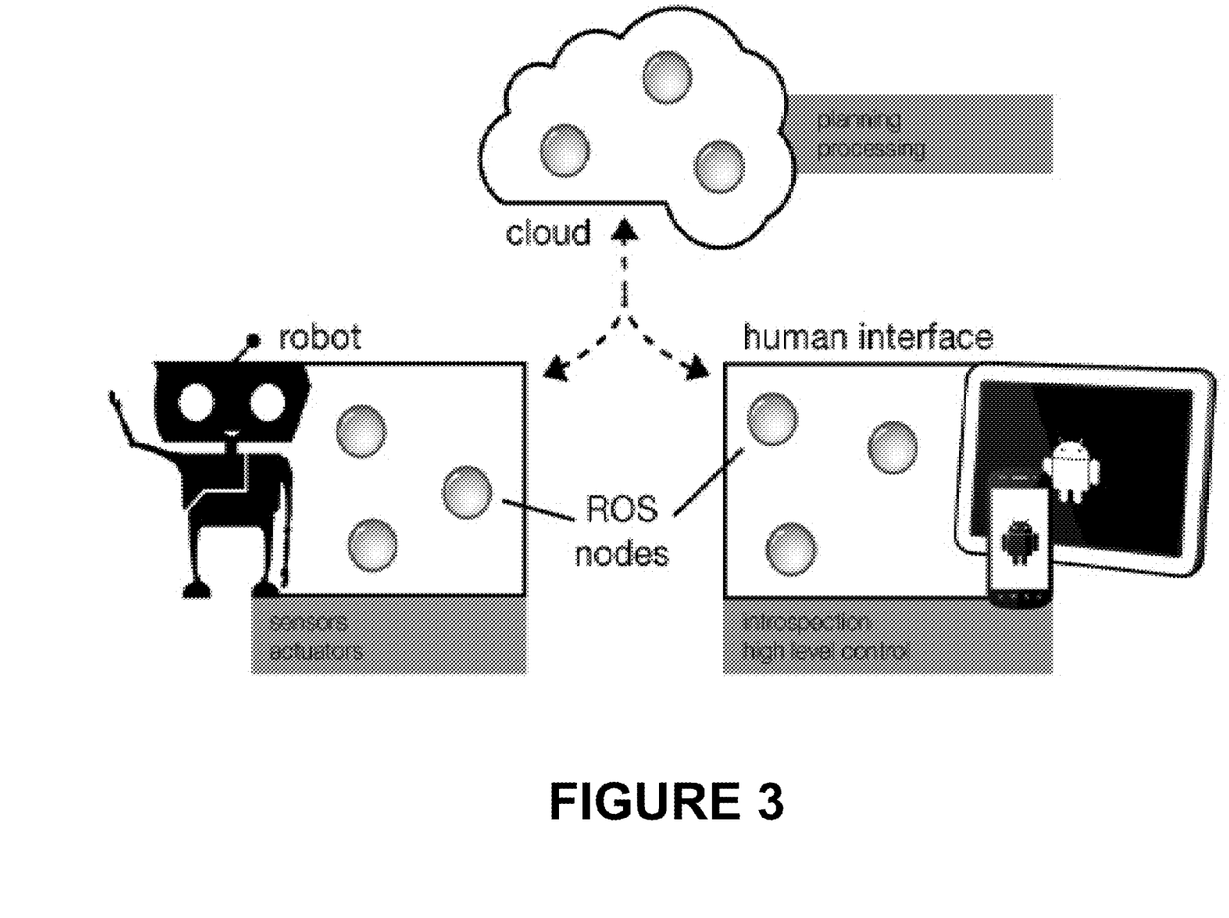
FIG. 3 illustrates an example of a conceptual robot-cloud interaction.

FIG. 3 illustrates an example of a robot-cloud interaction. A robot, such as a robot described and illustrated in FIGS. 2A-C, may connect to a network of computers (e.g., the cloud), and may request data or processing to be performed by the cloud. In one example, the robot may include a number of sensors and mechanical actuators that may generally provide motor control for the robot. The sensor inputs to the robot, such as camera feeds, vision sensors, touch sensors and other clothing probes, may be provided to the cloud, which can process these outputs to the cloud to enable the robot to extract information and perform functions. The cloud may process a camera feed, for example, to determine a location of a robot, perform object recognition as for an article of clothing, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send sensory data of object attributes to a cloud for data processing, and in another example the robot may receive data back from the cloud based upon processing of that sensory data. The data received from the cloud may be in many different forms. The received data may be a processed form of data the robot sent to the cloud. The received data may also come from sources other than the robot. For example, the cloud may have access to other sensors, other robots, and the Internet.

Figure 4:
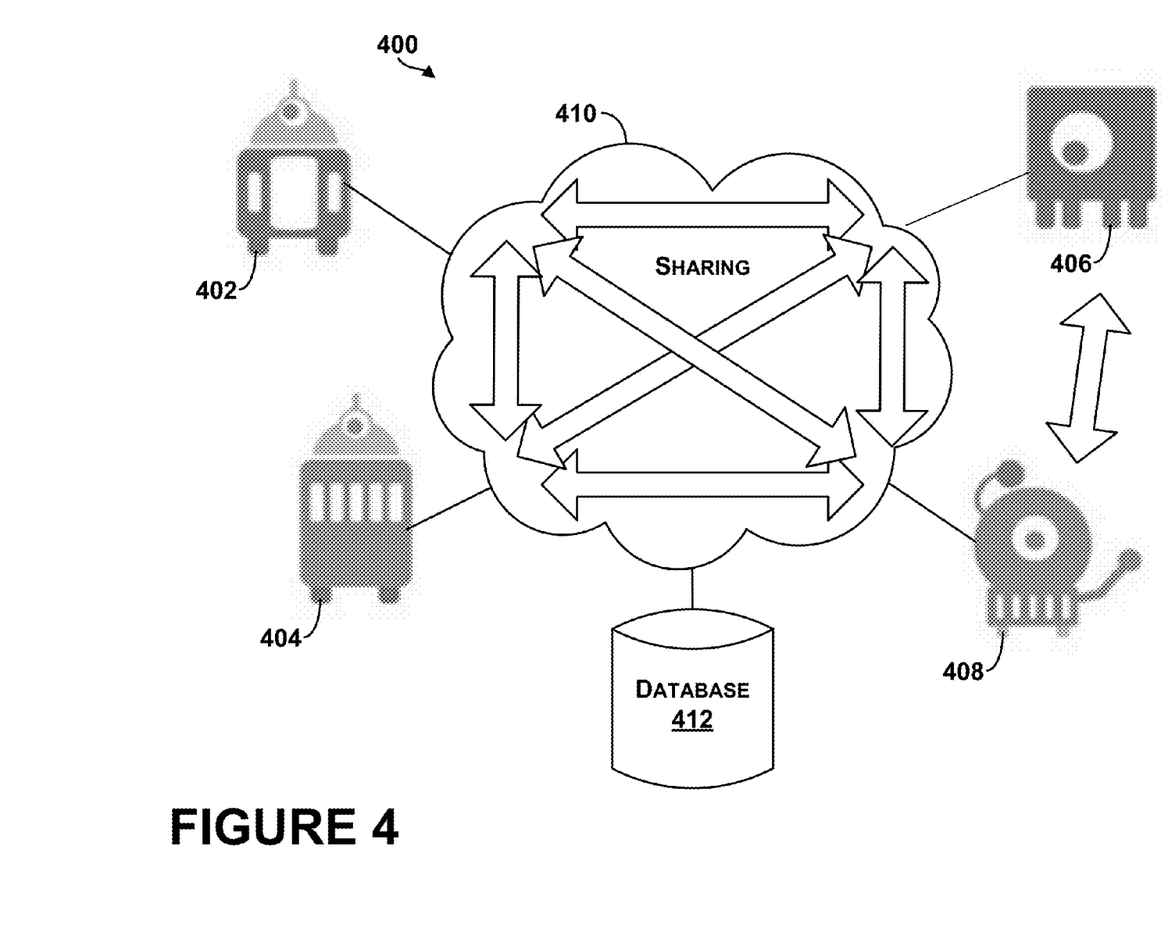
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be compiled into a larger data set. For example, the robot 402 may take a picture of a clothing object (image) and upload the image to the cloud 410. An object recognition program in the cloud 410 may be configured to identify the object in the image and provide data to all the robots connected to the cloud 410 about the recognized clothing, as well as possibly about other characteristics (e.g., metadata) of the recognized object, such as a location, size, weight, color. Thus, every robot may be able to know attributes of an object in an image uploaded by the robot 402.

The robots 402, 404, 406 and 408 may perform any number of actions with an area, people, or other robots. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. Robot 402 makes an assessment or determination based upon the observed object and/or user, which is then shared with the other robots 404, 406, and 408 (through the cloud 410). Each robot 402, 404, 406, and 408 will have access to real-time up to date data. One or more of these other robots may then proceed to perform some further function, such as picking up the object, and performing a task with the object. In another example, the robot 404 can download data indicating images seen by the other robots 402, 406, and 408 to help the robot 404 better identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may be an outdoor robot, and may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, data regarding a history of an output performed based upon some action taken by the robot (e.g., feedback on the action), can be provided to a new robot interacting with that type of situation or scenario in the future.

In one example, the cloud 410 may include, store, or provide access to a database 412 of information related to objects, and the database 412 may be accessible by all the robots 402, 404, 406, and 408. The database 412 may include information identifying objects that may be identical or similar, and details of the kinds of object e.g., mass, properties, shape, use, cost, any detail that may be associated with the object) that can be accessed by the robots 402, 404, 406, and 408 to perform object recognition and then interaction with the object.

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share new or learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and build a compendium related to an article of clothing, and then the robot can upload the data to the cloud 410 to share this knowledge with all other robots. In this example, a transportation of the given robot's "consciousness" can be made through the cloud 410 from one robot to another (e.g., robot "Bob" builds up a "map" of some clothing, and the knowledge of "Bob" can be downloaded onto another robot to receive knowledge of the "map").

Thus, within examples, the robots 402, 404, 406, and 408 may share information through the cloud 410, and may access the database 412.

4. Robot-Environment Interactions and Robot Behavior

As mentioned, robots (or any client computing device) may interact with the cloud and users to perform any number of functions. In one example, a robot may receive a command and attempt to respond to the command. The command may have a number of possible output functions to choose from, and the robot may be configured to resolve the command and determine an output function to perform. Example functionality is described below.

Figure 5:
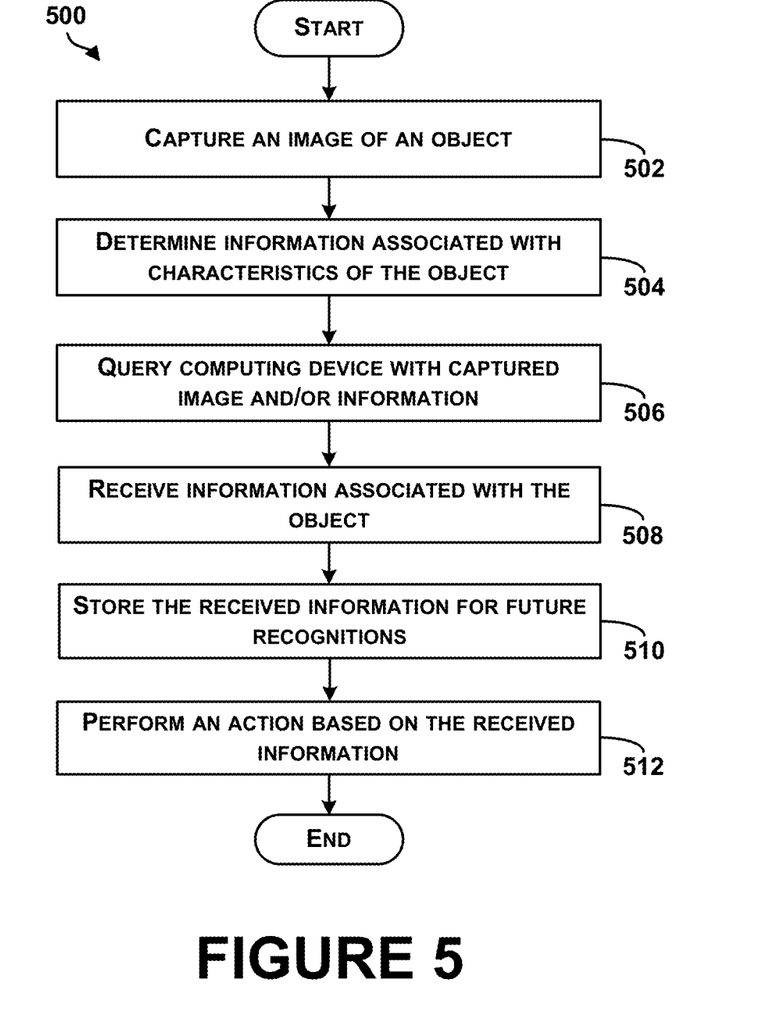
FIG. 5 is a block diagram of an example method of a robot function for object recognition.

FIG. 5 is a block diagram of an example method of a robot interaction with the cloud to facilitate general object recognition, in accordance with at least some embodiments described herein. Method 500 shown in FIG. 5 presents an embodiment of a method that, for example, could be used with the systems 100 and 400, for example, and may be performed by a device, such as another devices illustrated in FIGS. 1-4, or components of the device. While method 500 is related to object recognition, the method is an example of how a robot would otherwise interact with the cloud to obtain relational, or other, information to a situation or circumstances presenting themselves to the robot. That would also include processing occurring in the cloud. That processing could be in conjunction with processing also occurring in part with the robot, or locally through another informational/computational resource.

Method 500 may include one or more operations, functions, or actions as illustrated by one or more of blocks 502-512. Although the blocks are illustrated in a sequential order, these blocks may also be performed in parallel, and/or in a different order than those described herein, unless dictated by a necessary earlier step. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes capture an image of an object. In an example, a robot may capture many images of objects using any number of sensors, such as a camera (still pictures or video feeds), infrared projectors, and other sensors as discussed herein. In some examples, block 502 may be performed more generally by the robot receiving information of an object, which may include in some instances, capturing an image of the object. It may also include, in other instances, communicating with an object to receive data from the object (e.g., RFID communications).

At block 504, the method 500 includes determine information associated with characteristics about the object. For example, a robot may optionally determine or record dimensions, a texture, color, pattern, material, hardness, condition, or any type of physical attribute of the object. In one example, the robot may capture an image of the object, and provide the image to a server. The robot may receive any number of information from the server that relates to the object based on the server performing image recognition techniques.

As another example, in an instance in which the robot may communicate with the object, the robot may capture additional data of the object, such as by accessing a magnetic strip, RFID, near field communication clip, bar code, of the item. The robot may thereby communicate with the item to determine many types of data.

At block 506, the method 500 optionally includes query a computing device with the captured image and/or information. As an example, the robot may query the cloud with a captured image by sending the captured image to the cloud and requesting information about the image, such as an identity of the image or information associated with characteristics of the object in the image. Alternatively, the robot may query another robot directly to request information about the object, such as an image of an alternate view of the object.

At block 508, the method 500 includes receiving information or retrieving information associated with the object. For example, the robot may receive data from the cloud indicating an identity of the object in the image, or other information related to or associated with characteristics about the object.

At block 510, the method 500 includes storing the received information for future recognitions. For example, after receiving the information from the cloud, the robot would be able to recognize the object in the future enabling the robot to learn and adapt. Storing is an optional step.

At block 512, the method 500 includes performing an action based on the received information. The action may vary based on a type of received information, or the query that is presented by the robot. As an example, the robot may query the cloud to identify the object and details of the object to enable the robot to interact with the object, as well as a potential user of the object.

The method 500 may also include determining or selecting an action, from a database of actions, to perform based on the received information. The robot may include a database of executable instructions relating to possible actions that the robot may perform based on capabilities of the robot. The robot may thus compare received information with the possible actions to identify a match.

Figure 6:
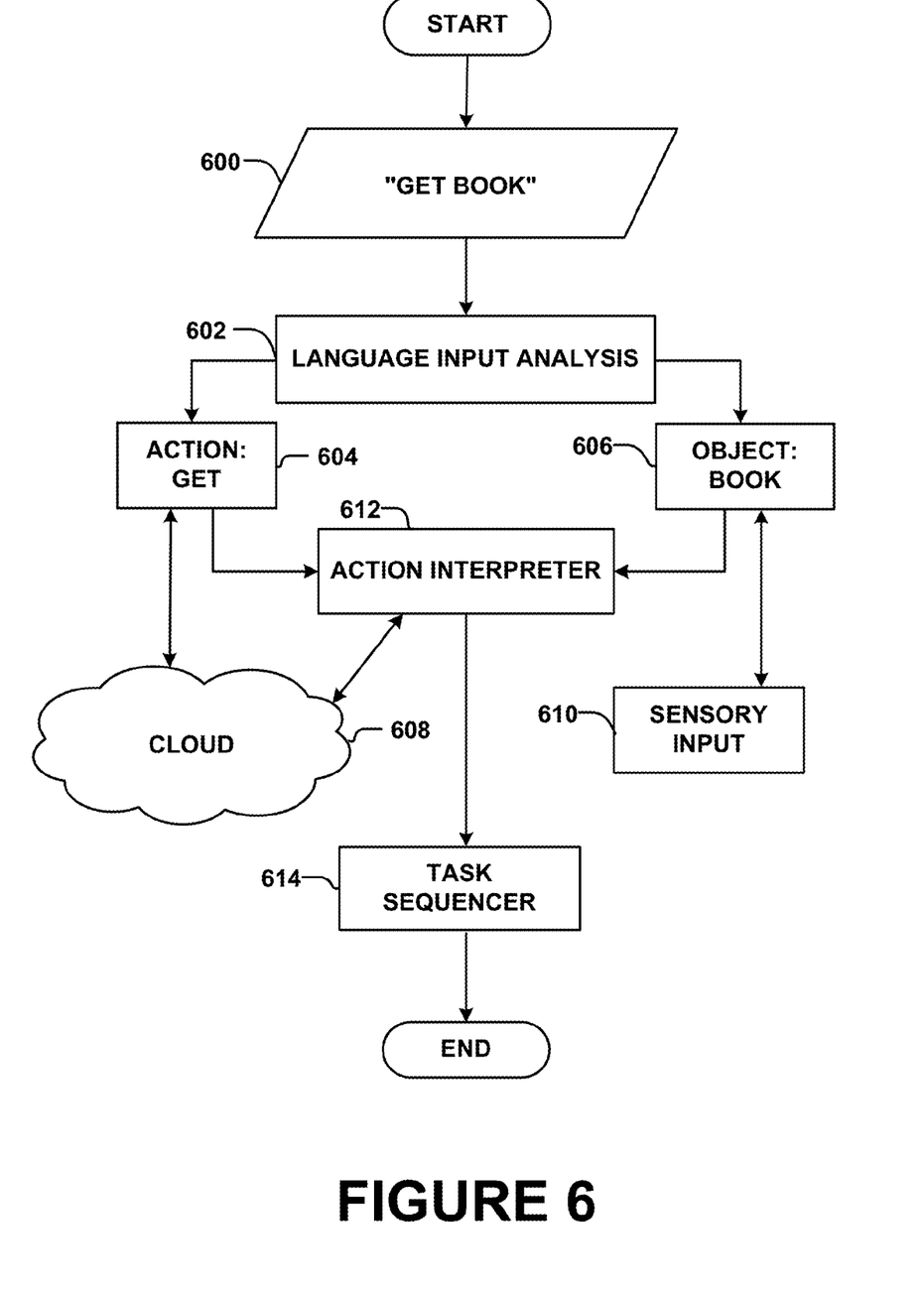
FIG. 6 is a block diagram of an example method of a robot determining and executing a command.

FIG. 6 illustrates an example flow diagram for robot command language interaction. In FIG. 6, a command input structure uses a verb for an action to be conducted, and a noun for an object or target of the action. This command structure maintains the input to just a verb and a target, so as to facilitate human-agent (robot) interface and command. In addition, in FIG. 6, a higher-level reasoning is used for a task and a lower-level classification reasoning is used in executing a task. Higher level reasoning may be directed to an action forming part of a task command, e.g., a verb, and can be used to resolve a command or situation into a context.

At block 600, a command may be received that is in a short-form of an action descriptor and a target or object (of the action), such as "GET BOOK." In this example, the short-form command is in a form of verb_noun. Other forms are possible as well. The short-form command may include any type of action descriptor and any information describing a target or object. This is a command, or request, which can be interpreted using language input analysis at block 602 to resolve the command into a specific classification reference: task (verb) is "GET" (block 604), and the object/target of classification (noun) of the task is "BOOK" (block 606).

In some examples, the short-form command structure may be centered upon action concepts that form a core to semantic interpretation of natural language. The short-form may facilitate the robot (agent) understanding and then processing of a command by attempting to distill out or eliminate (or at least reduce) longer and more complex input commands. In the short-form command, there may be one verb or a central verb establishing the action to be performed. Using the foregoing example, the robot may initially determine that "GET BOOK" does not involve making a book, in view of the user command being given in a home environment while the user is sitting on a couch. "GET" therefore more likely means "retrieve, obtain" rather than "make."

The robot's semantic interpretation process can be informed by existing language hierarchy or ontology, which may be part of the robot's own processing capability or accessed through a local system, or the cloud. Action concepts or higher-level functions, can thus be determined, and sorted on likelihood or probability. Likewise, the lower-level functions involved in executing upon each of the determined likely action concepts, are processed in a similar manner, along with the likely action concepts, as all of these functions, whether higher or lower level, will have preconditions, effects and outcomes that will vary an outcome function based upon interrelationships from a selected action concept, and requisite steps to execution of that action. Again using the foregoing example, "GET BOOK" may result in one determination where the book is to be retrieved from a library on the same floor as the robot, with the robot executing the retrieval itself in view of its capability to do so. "GET BOOK" may also result in another determination where the book is to be retrieved from a basement closet. The robot may then have to enlist another robot in the basement to retrieve the book if the robot to whom the command was given does not have the ability to traverse a stairway to the basement.

Higher level reasoning at block 604 may include obtaining relational information as to a pertinent task necessary to effect "getting," i.e., subsumed in executing the command. This may include a subroutine, as shown in block 608, to access the cloud to interpret the received command. As one example, the robotic device may obtain relational data about the command and in some instance of an environment of the robotic device from an informational resource, such as the cloud, for use in processing or determining what the command requires in the way of higher-level functionality, and lower-level functions included in the command. The relational data may comprise previously established classes, hierarchies or rules of higher-level and lower-level stages or steps involved in a task, and responses to those stages or steps, e.g., an ontology.

In a similar manner, the lower level classification reasoning may include obtaining relational information to the object classification of "BOOK." At block 610, this may include sensory input from an environment of the robot as to what "book" is involved (i.e., using the object recognition method 500 of FIG. 5). This lower level classification may thus further include a determination of which of several "books" may be actually specified or intended. Here again, environmental and user data may be accessed for the determination of which "book"; for instance, the user may be pointing to a book. The robot may thus use this sensory input to conclude that the "book" sensed is intended to be the subject of "GET."

Once the lower level classification is determined (what "BOOK"), and relational information on "GET" has been determined, the command is then subject to analysis using an action interpreter, as at block 612. Action interpretation may be resident on the robot or on a cloud server, and may be executed to formulate an appropriate, or most likely, action to execute. This may include processing again using the cloud.

The action interpretation may include filtering to refine the relational data in the situational/contextual environment sensed by the robot, and the use of a higher level of rules, such as weighting or harm-benefit analyses, from which the robot then performs reasoning, or determinations, regarding a command. The robot may have the sensory ability to evaluate the environment within which the command is to be executed, which may be dynamic in the sense of taking into consideration aspects of the environment that may be changing in the course of analysis or execution. Furthermore, the robot may have the ability to extrapolate to likely conclusions which may result as a consequence of selecting one likely command interpretation over another. That extrapolation may include determining event outcomes as by running simulations with changing variables. The robot may then factor an action based upon a chosen event outcome for a desired consequence.

In some examples, the robot may be configured to interpret a command based on its surroundings or the relevant environment, e.g., the location of the robot, the location of the user, state of the user, activity of the user, objects in the immediate area, the location of the target, whether the target in one of the objects in an environment of the robot, and so forth.

In further examples, the robot may determine that a number of functions are possible actions to perform in response to the command. The robot may then determine which targets are within an environment of the robot, and which relate to the target in the command. Further, the robot can determine a second set of functions based on actions capable using the targets in the environment of the robotic device. For example, if the command was "OPEN WINDOW", and there were no objects within the environment of the robot that may be opened, the robot may determine that the command may not be executed in this environment. Thus, the robot can determine a function to perform based on the second set of functions.

In one example, which of a book (target) to "GET" may be informed by the sensed environment. The robot may determine through electronic data gathering that the user is sitting on a couch, and based on past knowledge, that the user reads books while sitting on the couch. Based upon this environmental and situational/contextual data, the robot may then determine that the most-likely desired outcome or function is to "GET" a book from a bookshelf for the user. Changing the scenario, the robot may determine from visual data capture that the user is packing a cardboard box. The robot may determine, through accessing a user device, e.g., a smartphone with a schedule program that the user is leaving for a weekend vacation and will be driving six hours. Accessing the cloud, the robot may obtain various relational information concerning packing a box, with the most likely outcome under the circumstances presented being packing a book. The robot thereby determines obtaining a book as the most-likely outcome, and may proceed to execute upon that determination.

In a further example, the robot via an environmental analysis and response capability may use an electronic data capture device to capture data about an environment of the robot. The robot may be configured to obtain user-related data by communicating with a user device. The user-related data may be related to communication between a user and the user device containing user data. The user device may be one or more of a personal computer, a mobile telephone, a tablet computer, and a landline telephone.

A task sequencer program shown at block 614 may then be engaged to execute an output function for performing the subsumed task steps sequentially of getting the selected book. In some examples, lower level of task sequences associated with executing each of a number of possible functions for the command may be determined, and the robot can select a function to perform based on which lower level tasks may be performed in the environment of the robotic device. Also, the robot may select a function to perform based on which of the lower level of task sequences the robotic device is capable of performing due to mechanical capabilities of the robotic device.

In some examples, the method in FIG. 6 may result in a number of functions that may be performed in response to the command. The robot may provide a list or menu of output functions (e.g., to a user) as a result of analysis of the command input and await receipt of a selection of a function to be performed, or the robot may alternatively autonomously respond to the most-likely function generated by the command analysis. The robot may rank the functions based on the environment of the robotic device, based on targets in the environment of the robotic device, and/or based on capabilities of the robotic device, and determine a function to perform that has a highest ranking.

Figure 7:
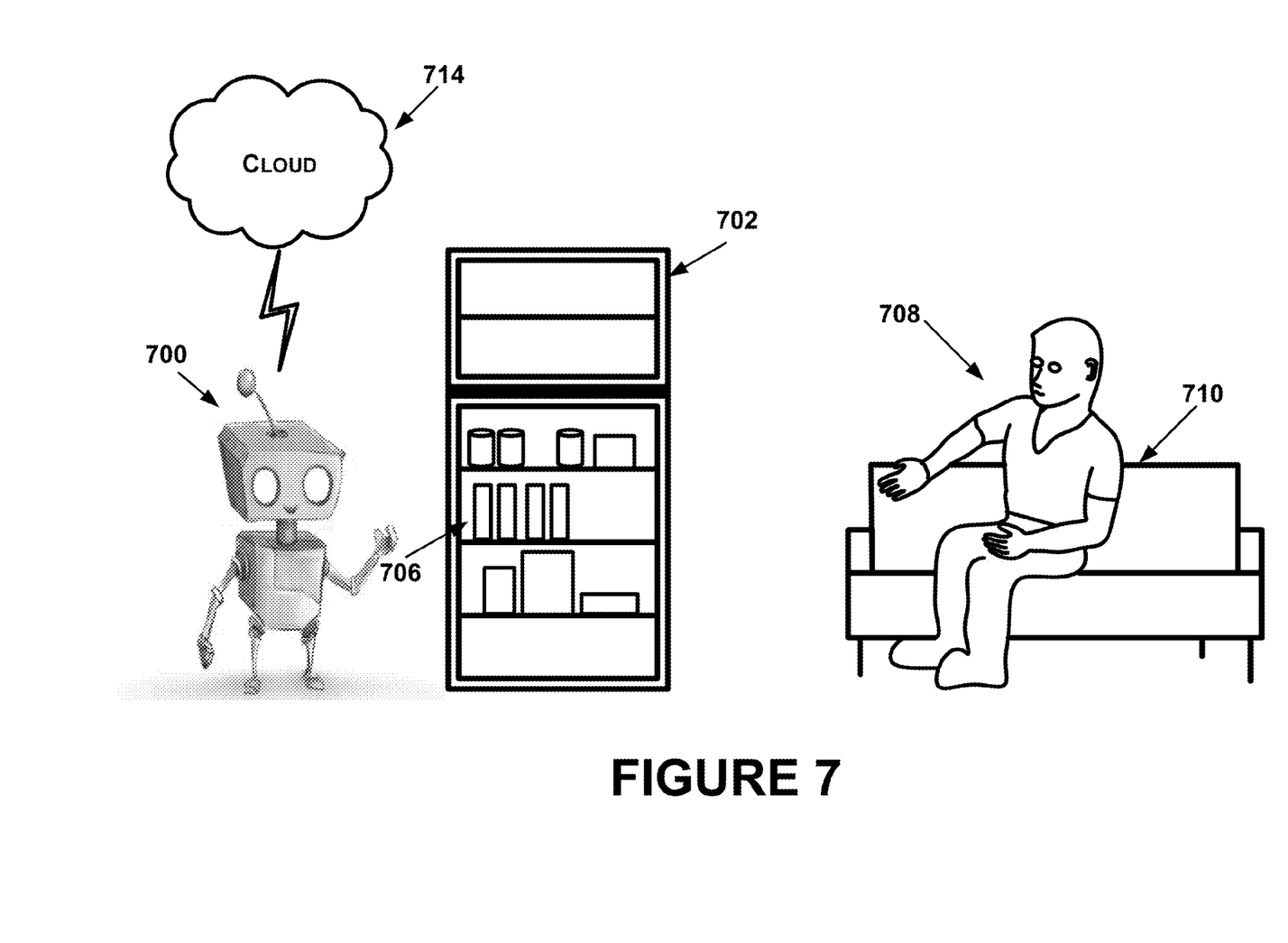
FIG. 7 is an example illustration of a robot executing a short-form command input.

FIG. 7 is an example of a conceptual illustration of a robot obtaining sensory input of target data, and also of determining lower level tasks or functions associated with an action verb and a likely target or object. For this example, the command given was "GET BOOK."

The robot 700 may parse a received command into a verb and object(s) by accessing a local database or the cloud to determine if the command includes one or more verbs and objects. Thus, the robot 700 can determine that the command includes "GET" and "BOOK," and determine that "GET" is an action verb and "BOOK" is the target or object. The robot

700 may search for relational information as to "GET" and thereby retrieve a number of possible meanings/actions involving "to get," or "getting." The robot 700 may also search and retrieve from a relational resource a number of possible meanings/results responding to "BOOK."

Regarding "GET," for instance, the robot 700 may need to perform situational analysis to recognize or deduce a meaning to the action verb "GET." In some embodiments, the robot 700, or a server engaged by the robot 700, may recognize or deduce the meaning of the word "GET" by searching a global database, or cloud 714, for interactions that the robot 700, or other robots, has had with the command "GET XXX." From this, the robot 700 may determine that a most frequent interaction with "GET" includes retrieving an object. The robot 700 may also determine that in the context of the situation that the robot has received the command, the most frequent interactions with "GET" include retrieving an object that is not already present. The robot 700 may thereby determine that "GET" is frequently used in commands where a user 708 or other users want an object brought to the user 708, instead of taken from the user 708. Using this information, the robot 700 (or server, if being processed by the cloud) may assign a higher probability to an output function involving "GET" than another possible interaction.

Based on the relational information obtained by the robot 700, the robot 700 (or remote computational resource, e.g., cloud 714) may determine the probability that of a correctly determined action and object in the command that need to be executed in an output function to carry out the command. In some embodiments, this probability may be compared to a threshold level. That threshold level may be set to produce a set of likely output functions that meet the command. Possible output functions may then be provided, as by display or audible communication, to the user 708 for verification or selection of one of the likely commands in the set. Alternatively, if the probability meets or exceeds the threshold, the robot 700 may perform appropriate steps to execute that most likely command. In either event, there may be lower-level reasoning for a sequence of tasks that may be accomplished to execute any given command. For example, there may be a series of instructions for the robot to (1) travel from its current location to a bookshelf 702, (2) identify a requested book, (3) grasp and remove a particular book 706 from the shelf, (4) travel from the bookshelf 702 to a location of the user 708 who asked the robot 700 to "GET BOOK" and (5) present the book 706 to the user 708.

If the probability does not exceed the threshold, the robot may request a server to perform additional analytics, as to obtain further information, such as query the user 708 (via the robot 700 or other communications mechanisms) or obtain additional data about the object's and/or robot's environment, until the threshold is met. If the robot/server remains unable to recognize the verb/object combination to a high enough probability to pass the threshold, then, after a period of time and/or a number of determination iterations, the robot/server may conclude that the correct output function is the one having the highest probability of matching the command out of a set of candidate output functions, for example, and execute that function.

In some embodiments, a confidence interval may be used instead of or in addition to a probability. The confidence interval may indicate how confident the robot/server is that it correctly identified the output function. A confidence interval threshold may be used to determine if the confidence interval meets or exceeds a desired level. If the confidence level meets or exceeds the desired level, the robot/server may execute accordingly. If the confidence level is below the desired level, the robot/server may perform additional analytics and/or calculations, obtain additional information, until the confidence interval meets or exceeds the desired level. If the robot/server is unable to reach a high enough confidence interval, then, after a period of time and/or a number of iterations, the robot/server may conclude that the correct output function is the one having the highest confidence interval of a set of candidate output functions, for example, and execute that one.

A number of analytics may be performed to aid the robot/server in recognizing the object, for instance here, "BOOK." An example analytic may include a contextual analysis. A contextual analysis may include the robot's 700 and/or the object's or user's surroundings, relationship with other objects, or location. In an example, contextual analysis may be used to determine that the user 708 is sitting on a couch 710, or there is a book located relatively close to the user. From this, the robot/server may deduce that the "BOOK" in point is one that is requested by the user.

In some examples, the robot 700 may determine that it cannot identify the kind of object in point (e.g., the kind of book), and then cause the robot 700 to go to possible objects and perform a further analysis (e.g., read books label, read a bar code). The robot 700 may also be configured to determine all possible books on the bookshelf (e.g., in inventory). Contextual analysis may also be used to determine that the bookshelf 702 includes books as well as other objects. For example, the robot 700 may use contextual analysis to determine that the book 706 has a size associated with common books. Additional analytics, such as situational analysis, may be used to recognize the object, an interaction with the object, a use of the object.

Interactions may be associated with one or more computer executable instructions. In some examples, the robot 700 may identify one or more computer executable instructions that may be associated with an interaction and/or with multiple interactions. In embodiments, the robot 700 may be provided feedback as to a success and/or failure of the command. The success and/or failure of the command may be used to update the instructions, local databases, global data, and recognition algorithms, for example.

In the example in FIG. 7, the robot 700 has obtained data on "GET" and determined that this action requires obtaining a book from the bookshelf. In an example, the robot 700 may scan or otherwise obtain an identifier (e.g., a barcode) on one of the books. The robot 700 may compare the identifier associated with one of the books 706 to one or more identifiers located in a local database, or resident with the robot 700, or in the cloud 714. In this way, the robot 700 may recognize the book 706 associated with the identifier as a particular book, for example. Additionally or alternatively, the robot 700 may acquire an image (e.g., with a camera) of the book and compare the image with one or more images located in a local database, resident with the robot, or in the cloud, to recognize the book 706 as of a particular book requested by the user 708.

In some embodiments, therefore, the robot 700 may obtain the identifier and send the identifier to the server, e.g., cloud 714. The server may access data located in the cloud and determine what object or objects may be associated with the identifier. Based at least in part on this determination, the server may recognize the object associated with the received identifier as the book 706, for example. Additionally or alternatively, the robot 700 may send the acquired image to the server, and the server may (1) identify the object in the image based on image recognition algorithms implemented by the server, and (2) send the results of the image recognition to the robot 700.

In further embodiments, the server may determine the probability that the server recognized the object accurately. For example, the probability that the server correctly recognized the object may be 100% when the barcode identifier was fully scanned and when the barcode is unique to a single object.

Higher level reasoning may also involve obtaining relational information as to the pertinent task steps necessary to effect "GET," the action verb. This may include a subroutine from past "GET" experiences, which may be resident in the robot's memory, or drawn from some other relational information resource (which could be another robot, for instance). For instance, the robot may obtain electronic data from a user device as to where the "getting" is to take place, and when "getting" is typically effected.

In a similar manner, the lower level classification reasoning may involve obtaining relational information to the object classification of "BOOK." This may include sensory input from the environment of the robot as to what "book" is involved (i.e., using the object recognition method 500 of FIG. 5).

In some examples, methodology of a higher-level service (e.g., higher in a software stack), that includes details and specifics for how to proceed may be performed by the cloud. As an example, using object recognition, a robotic device may execute software to perform immediate function calls, such as OrientObject( ), which may return information associated with an object (e.g., placing it right-side up), or RotateObject( ), which may cause the robot to pick up the object and obtain further views/sensory inputs. These immediate functions could be performed through local processing within the robot, or by enabling function calls and operation through the cloud, which may facilitate control and operation of the robot without having to control or tie-up more limited computational capacities of the robot, for example.

The actions or functions of the system and method of FIGS. 6 and 7 may be performed by the robot and the cloud (or components of the cloud) in a distributed manner. Alternatively, all actions or functions of the system and method may be performed locally by the robot, or processing for all actions or functions may be performed by the server and communicated to the robot. For instance, actions or functions of the system and method of FIGS. 6 and 7 may be performed by the robot, which may make queries to the cloud to facilitate performing the functions.

It should be understood that arrangements described herein are for purposes of example only. As such, those skilled in the art will appreciate that other arrangements and other elements (e.g., machines, interfaces, functions, orders, and groupings of functions) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, at a robotic device that includes at least one sensory device, a short-form command comprising at least an action descriptor and a target for the action descriptor, wherein the action descriptor includes a verb;
determining a plurality of functions corresponding to the action descriptor, wherein determining the plurality of functions comprises determining an action to perform based on the verb, and wherein determining the action to perform based on the verb comprises determining a past action performed by the robotic device based on the verb or a similar verb;
determining a plurality of targets in an environment of the robotic device that at least relate to the target; and
determining, from the plurality of functions, a given function to perform based on (i) the plurality of targets in the environment relating to the target and (ii) the environment of the robotic device.

2. The method of claim 1, further comprising:
determining a location of each of the plurality of targets in the environment of the robotic device relating to the target; and
determining the given function to perform based on the location of each of the plurality of targets in the environment.

3. The method of claim 1, further comprising:
determining a lower level of task sequences associated with executing each of the plurality of functions; and
determining, from the plurality of functions, the given function to perform based on the lower level of task sequences associated with executing, within the environment of the robotic device, each of the plurality of functions.

4. The method of claim 1, further comprising:
providing the plurality of functions for selection; and
receiving a selection of one of the plurality of functions to perform.

5. The method of claim 1, wherein determining the plurality of targets in the environment of the robotic device relating to the target comprises receiving sensory data input to the at least one sensory device, wherein the sensory data input relates to the environment of the robot.

6. The method of claim 1, wherein determining, from the plurality of functions, the given function to perform comprises:
determining a lower level of task sequences associated with executing each of the plurality of functions; and
determining which of the lower level of task sequences the robotic device is capable of performing based on mechanical capabilities of the robotic device.

7. The method of claim 1, further comprising determining the plurality of functions based on the target being one of the plurality of targets in the environment.

8. The method of claim 1, wherein receiving the short-form command comprises receiving the short-form command from a user, and the method further comprises:
determining a location of the user;
determining the plurality of functions based on the location of the user.

9. The method of claim 1, further comprising:
determining the environment of the robotic device;
determining the plurality of functions based on objects in the environment.

10. The method of claim 1, further comprising:
   ranking the plurality of functions based on the environment of the robotic device, the plurality of targets in the environment of the robotic device, and capabilities of the robotic device; and
   based on the ranking, determining the given function to perform.

11. The method of claim 1, wherein the short-form command is in a form of a verb followed by a noun.

12. The method of claim 1, wherein receiving the short-form command comprises receiving the short-form command from a user, and the method further comprises:
   determining an activity of the user; and
   determining, from the plurality of functions, the given function to perform based on the activity of the user.

13. The method of claim 1, further comprising:
   determining a second plurality of functions based on actions capable using the plurality of targets in the environment of the robotic device; and
   determining, from the plurality of functions, the given function to perform based also on the second plurality of functions.

14. A non-transitory computer readable medium having stored therein executable instructions that, when executed by a robotic device that includes at least one sensory device, causes the robotic device to perform functions comprising:
   receiving a short-form command comprising at least an action descriptor and a target for the action descriptor, wherein the action descriptor includes a verb;
   determining a plurality of functions corresponding to the action descriptor, wherein determining the plurality of functions comprises determining an action to perform based on the verb, and wherein determining the action to perform based on the verb comprises determining a past action performed by the robotic device based on the verb or a similar verb;
   determining a plurality of targets in an environment of the robotic device that at least relate to the target; and
   determining, from the plurality of functions, a given function to perform based on the plurality of targets in the environment relating to the target and on the environment of the robotic device.

15. The computer readable medium of claim 14, wherein the instructions are further executable by the robotic device to cause the robotic device to perform functions comprising:
   determining a lower level of task sequences associated with executing each of the plurality of functions;
   determining which of the lower level of task sequences the robotic device is capable of performing based on mechanical capabilities of the robotic device; and
   determining, from the plurality of functions, the given function to perform based on which of the lower level of task sequences the robotic device is capable of performing within the environment of the robotic device.

16. The computer readable medium of claim 14, wherein the functions further comprise:
   determining the plurality of functions based on the environment of the robotic device and based on objects in the environment.

17. A robotic device comprising:
   one or more processors;
   at least one sensor coupled to the one or more processors and configured to capture data about an environment in a vicinity of the at least one sensor; and
   memory including executable instructions stored thereon that, when executed by the one or more processors, causes the robotic device to perform functions comprising:
      receiving a short-form command comprising at least an action descriptor and a target for the action descriptor, wherein the action descriptor includes a verb;
      determining a plurality of functions corresponding to the action descriptor by determining a past action performed by the robotic device based on the verb or a similar verb;
      determining a plurality of targets in the environment of the robotic device that at least relate to the target; and
      determining, from the plurality of functions, a given function to perform based on the plurality of targets in the environment relating to the target and on the environment of the robotic device.

18. The robotic device of claim 17, further comprising:
   determining a second plurality of functions based on actions capable using the plurality of targets in the environment of the robotic device; and
   determining, from the plurality of functions, the given function to perform based also on the second plurality of functions.

* * * * *